United States Patent Office 3,574,692
Patented Apr. 13, 1971

3,574,692
STABILIZED HALOGEN CONTAINING POLYMERS
Walter Stamm, Tarrytown, N.Y., assignor to Stauffer
Chemical Company, New York, N.Y.
No Drawing. Application Jan. 12, 1967, Ser. No. 608,751,
which is a continuation-in-part of application Ser. No.
586,045, Oct. 12, 1966. Divided and this application
Aug. 2, 1968, Ser. No. 763,463
Int. Cl. C08h 9/02
U.S. Cl. 260—399         6 Claims

ABSTRACT OF THE DISCLOSURE

Novel compounds useful as stabilizers for halogen containing polymers such as polyvinyl chloride are represented by the formula:

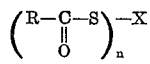

wherein R is a hydrocarbyl group, $n$ is an integer having a value of from 1 to 2, and X is selected from the group consisting of hydrogen, alkali metal, alkaline earth metal, and acryl moieties having a hydrocarbyl residue.

---

This application is a division of application Ser. No. 608,751 filed Jan. 12, 1967, now Pat. No. 3,461,091, which is a continuation in part of patent application U.S. Ser. No. 586,045 filed Oct. 12, 1966, now abandoned.

High molecular weight halogen containing polymeric compositions exhibiting a high degree of stability containing a stabilizing amount of a stabilizing compound having the formula

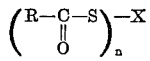

wherein R is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive. These stabilizers have proven to be particularly effective in the polyvinyl chloride resin compositions. Included among the preferred stabilizers is thiollauric anhydride, thioloieic anhydride, thiolbenzoic anhydride and thiolstearic anhydride. This stabilizing system is one of the few proposed for vinyl type resins which does not contain a heavy metal moiety such as tin as an integral part of the stabilizer. An additionally preferred stabilization system for such resins, include combinations of such materials as zinc stearate and thiolstearic acid. It is similarly preferred that the resins contain a small but effective amount of an epoxidized stabilizer such as an epoxidized fat.

The present invention relates to the stabilization of polymers against degradation and discoloration due to heating. More particularly, it relates to heat stabilization of halogen containing hydrocarbon polymers, especially chlorine containing polymers of vinyl monomers including homopolymers of polyvinyl chloride and polyvinylidene chloride as well as copolymers of each. Still more particularly, the invention relates to the heat stabilization of such polymers employing certain thiol acids and derivatives thereof which are hereinafter defined.

It is well known that chlorovinyl polymers, and in particular polyvinyl chloride, undergo discoloration and degradation at the elevated temperatures required for operations such as molding and product formation. In order to overcome this problem a suitable amount of a heat stabilizing composition is generally blended with plasticized or unplasticized resinous material prior to molding. One suitable component of commercial stabilizing compositions employed widely today is stearic acid or salts thereof. The stearic acid derivatives have found wide acceptance because they exhibit acceptable performance, are readily available at a low cost and are non-toxic. Unfortunately, stearic acid and its derivatives are unsuitable for general use at the high processing temperatures required to work the rigid, unplasticized polyvinyl chloride and permit discoloration and degradation after a relatively short period of time even at the lower temperatures (i.e., about 310° F.) required for processing of flexible, plasticized polyvinyl chloride. Other known stabilizers for polyvinyl chloride include the organotin compounds, which because of their unusual heat stabilizing properties set a standard for heat stability which is difficult to equal. However, the organotin compounds have the disadvantage that they are very expensive and toxic, which greatly limits their scope of application.

It is therefore the object of the present invention to overcome and eliminate the deficiencies inherent in the stabilization of halogen containing polymers and to provide improved, heat stabilized polymeric composition in an economically attractive manner.

Another object of the present invention is to provide an improved, heat stabilized composition comprising polyvinyl chloride and polyvinylidene chloride homopolymers as well as copolymers.

Another object is to provide heat stabilized chlorovinyl polymers which are colorless, clear, non-blooming, odorless and non-toxic.

Another object of the present invention is to provide novel, heat stable compositions comprising a chlorovinyl polymer and a thiol acid or suitable derivative thereof.

Another object of the present invention is to provide novel, alkaline earth soaps of a thiol acid useful in the heat stabilization of polyvinyl chloride.

Other objects and advantages inherent in the present invention will become apparent from the following description and disclosure.

The above stated and other objects are generally accomplished in accordance with the present invention by providing a heat stabilized halogen containing polymeric composition containing as a stabilizer an effective amount of a compound of the type:

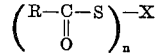

wherein R' is a hydrocarbyl group consisting essentially of hydrogen and carbon having from 5 to 21 carbon atoms and preferably from 6 to 17 carbon atoms, $n$ equals 1 or 2, and X is selected from the group consisting of hydrogen, alkali metal including ammonia, alkaline earth metals and an acyl moiety of the type

wherein R' is a hydrocarbyl group consisting essentially of hydrogen and carbon containing from about 1 to about 17 carbon atoms inclusive. The term "consisting essentially of hydrogen and carbon" refers to substituted hydrocarbon moieties containing an occasional or infrequent substituent comprising an element other than hydrogen and carbon, e.g., nitrogen or chlorine which does not materially alter the properties of the hydrocarbon residue, i.e., remains inert, as well as to purely hydrocarbon moieties. This invention is predicated upon the discovery that the incorporation of, say, 3 percent of a compound defined above in vinyl chloride polymer gives a wholly unexpected improvement in polymer color during heat processing as compared with stearic acid, lauric acid or benzoic acid and their derivatives after processing at elevated temperatures over a protracted period of time. In the practice of the present invention it has been found that the incorporation of thiollauric anhydride into plasticized polyvinyl chloride resin in an amount such that the sulfur content of the mixture is as low as 0.1% by weight gives an unexpected improvement in stabilization at high temperatures.

Representative groups of compounds within the scope of the above-identified formula include the aliphatic thiol acids such as the fatty thiol acids, alkali metal soaps of the fatty thiol acids, alkaline earth metal soaps of the fatty thiol acids, as well as the fatty thiolanhydrides; aromatic thiol acids, alkali metal salts of the aromatic thiol acids, alkaline earth salts of the aromatic thiol acids, as well as the aromatic thiol anhydrides.

Representative of specific compounds suitable for use in accordance with the present invention include the thiolcaproic, thiolenanthic, thiolcaprylic, thiolpelargonic, thiolcapric, thiolundecanoic, thiollauric, thioltridecanoic, thiolmyristic, thiolpentadecanoic, thiolpalmitic, thiolmargaric, thiolcarboxylic analogs of so-called neo-acids, thiolstearic, thiolnonadecanoic, thiolarachidic and thiolheneicosanoic acids, thiolnaphthenic acid, thiolbenzoic acid, phenylthiolacetic acid, methylthiolbenzoic acid, tolylthiolacetic acid, naphthalenethiolcarboxylic acids, as well as the alkali and alkaline earth salts and anhydrides thereof. Compounds containing the same number of carbon atoms as the above but which have unsaturated bonds present, e.g., undecylenic, oleic and thiolcrotonic acids, etc., are likewise suitable.

Representative of preferred specific compounds within such groups include thiolstearic acid, thiolpalmitic acid, thiolversatic acid, thiollauric acid, thiolbenzoic acid, thioltoluic acid, thiolmesitoic acid, zinc thiolstearate, calcium thiolstearate, cadmium thiolstearate, barium thiolstearate, magnesium thiolpalmitate, zinc thiollaurate, cadmium isododecanoate, mixed thiol fatty acid soaps, zinc thioleate, thiolstearic anhydride, stearic palmitic thiolanhydride, thiolbenzoic anhydride, thiollauric anhydride, potassium thioloeate, soaps of the thioltallates, dodecenyl succinic thiolanhydride, thiolphthalic and thioltetrahydrophthalic anhydride, and the like, as well as mixtures of such compounds.

The following compounds are illustrative of the essentially hydrocarbon moieties containing an occasional and infrequent, inert substituent other than hydrogen and carbon: alpha-hydroxythiolstearic acid, 9,10-dihydroxythiolstearic anhydride, zinc 11-aminothiolundecanoate, nitro and chlorothiolbenzoic anhydrides.

As indicated above, compounds of the type set forth above are useful in improving the thermal stability of halogen containing polymers including homopolymers as well as copolymers produced from vinyl halide and vinylidene halide monomers. The compounds of the type set out above are particularly useful in stabilizing halo vinyl polymers. The term halo vinyl polymer as employed herein is intended to mean a polymer produced from a monomeric material of the type:

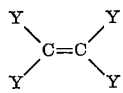

where one or more "Y" represents halogen, preferably chlorine or bromine, but including fluorine and iodine, covalently bonded to a carbon and the remaining "Y" or "Y's" represent a hydrocarbon residue or hydrogen. It is to be understood that the stabilizer compounds of the present invention are similarly useful in inhibiting deterioration of post-halogenated polymers such as hydrocarbon polymers chlorinated after polymerization. Representative copolymeric compositions in which the stabilizer compounds of the present invention are useful include, e.g., copolymers of vinyl chloride or vinylidene chloride with themselves or with vinyl carboxylate esters, e.g., vinyl acetate and vinyl stearate, vinyl ethers, e.g., methyl vinyl ether, ethylene, propylene, styrene, maleic and fumaric acids. The stabilizer compounds of the present invention are useful in rigid, unplasticized halovinyl polymers and copolymers as well as plasticized materials. In particular, these compounds are useful in rigid polyvinyl chloride as well as in such polymers containing a plasticizer such as dioctyl phthalate, octyl diphenyl phosphate. Such plasticizers are generally present in an effective amount which is usually between 10 and 60%.

While the stabilizer compounds in accordance with those of the present invention exhibit marked improvement over closely related compounds in the prior art when employed alone, or in various combinations thereof, it is understood that the compounds of the present invention can be even more advantageously employed in combination with co-stabilizing additives known in the art which include, for example, chemical compounds of the type: organic phosphites, metallic soaps such as calcium or zinc stearate, fatty acids such as stearic acid, phenolic compounds including substituted phenols, barium or cadmium phenolates, phosphinates, phosphonates, mercaptides and sulfides, epoxidized fatty oils, episulfides and epoxides, indoles, lead soaps, including lead naphthenates, polyols, such as sorbitol or pentaerythritol, esters of aminocrotonic acid, dialkyltin carboxylates or mercaptides, alkylstannoic acids, urea or thiourea derivatives, as well as other additives known in the art of halovinyl polymers stabilization.

It is apparent that the percentage of the fatty thiol compound of the present invention which must be employed in making satisfactory heat stabilized compositions of the present invention in order to achieve the satisfactory improvement in heat stability, will vary over a wide range, depending upon the particular halovinyl polymer in which it is employed, the particular need for stabilization, the particular end use of the resin, the presence of plasticizing or other co-stabilizing additive materials, as well as the time and temperature processing requirements in making a suitable final product. The presence of between about 0.01% and about 10% by weight of the stabilizer compound of the present invention will be sufficient for most applications, although the preferable range is between about 1% and about 5% of said compound on a weight basis.

The thiol acids and anhydrides useful in the present invention can be prepared in accordance with procedures known in the literature as well as from the novel procedures hereinafter specified. Thiolstearic acid, for example, can be prepared from stearoyl chloride and hydrogen sulfide as well as from stearoyl chloride and alkali or alkaline earth salts of hydrogen sulfide. In the practice of the present invention, thiolstearic acid (M.P. 37°–41° C). has been prepared from stearoyl chloride and hydrogen sulfide in 96 percent yield employing pyridine as an HCl acceptor. The preparation of certain other thiol acids, e.g., thiolmyristic, thiolbenzoic, as well as thiolpalmitic acids has likewise been reported in the literature. They can also be obtained by cleavage of acid anhydrides with hydrogen sulfide. In general, the organic thiol acids are practically colorless at room temperature.

It is contemplated that thiol acids can be produced in accordance with two separate, novel and useful processes as follows. Firstly, the production of such acids is contemplated by the reaction of the desired carboxylic acid, e.g., decanoic acid with phosphorus pentasulfide ($P_2S_5$) to produce the corresponding thiol acid, e.g., thioldecanoic acid. The thiol acid is then separated from side products, e.g., dithiolacids, remaining carboxylic acid and phosphorus pentasulfide, for example, by distillation. Another contemplated process route involves the cleavage of fats or other esters of fatty acids employing either hydrogen sulfide under an elevated pressure in the presence of catalysts or salts of hydrogen sulfide. Hydrogen sulfide pressure in the range of from 100 to 1000 p.s.i. are believed to be suitable for this purpose. The reaction is represented formulistically below with a glyceride, or fat, wherein R represents a suitable aliphatic hydrocarbon moiety hereinbefore defined:

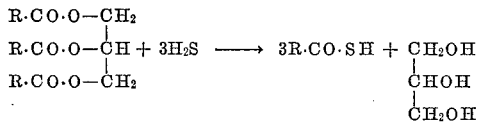

The above represented process appears highly attractive from an economic standpoint since the glycerides are readily available in commerce at low cost, e.g., tallow fats.

The alkaline earth metal soaps of thiol acids, in particular, the respective zinc, cadmium, calcium, and barium soaps of thiolstearic acid are new and useful compounds discovered in the practice of the present invention. It has been found that the soaps useful in the present invention can be prepared, e.g., by metathetical exchange reactions between a suitable alkali thiolstearate salt and a salt of an alkaline earth metal. The soaps can also be produced by the reaction of alkaline earth oxides, acetates, carbonates, for example, with fatty thiol acids. Examples of the preparation of these novel compounds as well as the preparation of thiolstearic anhydride and thiolbenzoic anhydride are presented below.

EXAMPLE 1

Zinc thiolstearate

To 62 grams (0.203 mole) of thiolstearic acid in 500 milliliters of ethanol was added 13.35 grams (0.203 mole) of 85% pure potassium hydroxide, dissolved in 125 milliliters of alcohol, with stirring at 40° C. The agitated slurry was then warmed up to 50° C. After 30 minutes 13.6 grams (0.101 mole) of anhydrous zinc chloride was added, dissolved in 300 milliliters of alcohol. The reaction mixture was warmed up to 70° C. for 30 minutes and then quickly filtered while hot. Upon cooling about 78 grams (approximately 60% of theory) of zinc thiolstearate crystallized out. More product was obtained from the mother liquor. The melting point of pure zinc thiolstearate was 92°–95° C.

EXAMPLE 2

Calcium thiolstearate

To the slurry of 50 grams (0.167 mole) of thiolstearic acid in 300 milliliters of ethanol was added 9.4 grams (0.167 mole) of KOH dissolved in ethanol. After 15 minutes 9.3 grams (0.084 mole) of anhydrous calcium chloride, also dissolved in ethanol, was added with stirring. After one hour the crude solution was filtered and ethanol removed by distillation. The residue was carefully washed with acetone, yielding 31 grams of calcium thiolstearate; M.P. 108°–111° C.

EXAMPLE 3

Barium thiolstearate

To the slurry of 36 grams of thiolstearic acid in 500 milliliters of ethanol was added 72 grams of a 77% pure KOH in ethanol. After 30 minutes a hot, 50% aqueous ethanol solution containing 31.6 grams of barium nitrate was added to the hot, agitated potassium thiolstearate solution. After 10 minutes the hot reacting mixture was filtered and the filtrate cooled. A crystalline precipitate was recovered in practically quantitative yield. It was washed with hot water and dried over $P_2O_5$; M.P. 162°–166° C.

EXAMPLE 4

Thiolstearic anhydride

To 2.0 grams (0.066 mole) of thiolstearic acid in 50 milliliters of carbon tetrachloride are added 2.1 grams (0.069 mole) of stearoyl chloride and ten drops of pyridine at 40°–50° C. After one hour pyridine hydrochloride is removed by filtration, and the filtrate is evaporated to dryness. The resultant solid (5.3 grams; M.P. 76–79° C.) is recrystallized from heptane: M.P. 78–79° C.; yield practically quantitative. The compound has a sharp band in the I.R. at $5.75\mu$ and analyzes correctly.

The heat stabilized polymeric materials of the present invention can be produced by admixing a suitable amount of the thiol compound of the present invention and a suitable halogen containing resin, e.g., emulsion or suspension polymerized polyvinyl chloride, together with other additives desired and then blending the mixture in suitable means known in the art for this purpose. The resulting blend can then be formed into useful end products by known methods including molding, extrusion, calendering or various sheet forming operations.

The following examples are presented to illustrate the surprisingly improved performance of the stabilizers of the present invention as compared with the most closely related compounds known in the halo vinyl polymer heat stabilization art.

EXAMPLE 5

The heat stabilized polyvinyl chloride compositions set forth in Table I, below, were formulated on the follow basis: Geon 103 EP (homopolymer of polyvinyl chloride), 100 parts; dioctyl phthalate (plasticizer), 30 parts; parts stabilizer compound indicated in Table I. The various formulations were blended and banded to obtain homogeneous blends and then subjected to a conventional milling test to determine dynamic heat stability employing mill conditions as follows: front roll, 30 f.p.m., 310° F.; rear roll, 42 f.p.m., 315° F.; nip setting, 0.035 inch. Samples were taken at 10 minute intervals during continuous milling and the resulting data relating to discoloration are presented in Table I, following.

TABLE I

| Stabilizer | Initial | 10 | 20 | 30 | 40 | 50 | 60 | 70 | 80 | 90 |
|---|---|---|---|---|---|---|---|---|---|---|
| Zinc stearate (2 parts) + thiolstearic acid (2 parts). | White | White | Light brown. | Light brown. | | Light brown. | Light brown. | Light brown. | | Black. |
| Zinc thiolstearate (3 parts)[1] | do | do | White | do | Light brown. | Brown | Brown | Brown | Brown | Brown. |
| Zinc stearate (3 parts)[2] | do | Black spots. | | | | | | | | |
| Thiostearic anhydride (3 parts) | do | White | White | White | White | White | White | Light yellow. | Light yellow. | Light brown. |
| Thiostearic acid (3 parts)[3] | do | do | do | do | do | do | Light brown. | Light brown. | Light brown. | Do. |
| Stearic acid (3 parts)[4] | do | Brown | Dark brown. | | | | | | | |
| Calcium thiolstearate (3 parts) | do | White | Grey | Grey | Grey | Light brown. | Light brown. | Light brown. | Light brown. | Light brown. |
| Calcium stearate (3 parts) | do | Grey | Light brown. | Brown | Brown | Brown | Brown | Brown | Brown | Brown. |

[1] Dark brown at 105 minutes.
[2] Failure in less than 10 minutes.
[3] Brown at about 140 minutes; dark brown about 200 minutes.
[4] Failure in less than 20 minutes.

The following further observations were made during these experimentations:

(1) No odor was noticed during processing of the thiol compounds at 315° F.

(2) The stearic acid sample showed color after five minutes and failed entirely after twenty minutes whereas thiolstearic acid showed only a very gradual color development over a total period of 240 minutes. The samples were practically colorless through 50 minutes and did not become brown until after about 140 minutes of processing.

(3) Thiolstearic, thiollauric and thiolbenzoic anhydride stabilized resins stayed essentially colorless through 120 minutes.

(4) PVC resins containing thiollauric anhydride as stabilizer showed better clarity than those stabilized with thiolstearic anhydride.

(5) The zinc stearate sample showed large black spots in less than 5 minutes whereas the zinc thiolstearate showed no color for about 30 minutes and did not become dark brown until about 120 minutes.

(6) It was found that zinc thiolstearate as well as thiolstearic acid used alone showed "bloom" or migration to the surface of the resin, whereas when used in combination with each other the resulting material unexpectedly did not bloom, but rather resulted in a clear resin.

(7) When zinc stearate or thiolstearic acid were incorporated into resins separately, the films produced were cloudy whereas the combination of zinc stearate and thiolstearic acid in the resin unexpectedly gave clear plastic films which were also odorless.

(8) Resins containing about 5% of epoxidized fats in addition to the thiol compounds of this invention showed further substantially increased stability as evidenced by improved color.

(9) Related thiol acid esters such as butylthiolstearate provided no significant stabilization.

EXAMPLE 6

Preparation of thiolbenzoic anhydride

In 300 milliliters of hot water was dissolved 140 grams of 60% aqueous sodium sulfide. To this solution were added three grams of a commercial wetting agent[1] and 90 grams of disodium acid phosphate hydrate as buffer. After cooling the mixture to 0° C., 280 grams of benzoyl chloride were added with continued stirring of the mixture. The batch temperature was kept below 15° C. throughout. Thiolbenzoic anhydride was filtered from the reaction mixture, washed with cold water and dried under vacuum at 35° C. The product had a melting point of 47–49° C. and was recovered in 96% yield.

EXAMPLE 7

Preparation of thiollauric anhydride

In a reaction flask provided with a stirrer, dropping funnel and an efficient cold water condenser were dissolved 21.6 grams (0.1 mole) of thiollauric acid in 50 milliliters of benzene. A constant stream of dry nitrogen was sparged through the agitated solution which was warmed up to 60° C. Then 22 grams of distilled lauroyl chloride were slowly added to the reactor through the dropping funnel. The addition was completed in about 30 minutes, and the reaction was brought to completion by stirring the mixture for about four hours at reflux temperature. A small amount of pentane (about 20 milliliters) was then added to the solution which was cooled down to room temperature. Thiollauric anhydride crystallized out in good yield and high purity. Melting point 52°–54° C.

EXAMPLE 8

Preparation of thiololeic anhydride

Molar quantities of thiololeic acid and oleoyl chloride were reacted under conditions practically identical to those employed in Example 7. Thiololeic anhydride was isolated as a colorless oil which was analytically pure without distillation.

EXAMPLE 9

Evaluation of stabilization effect

The stabilization effects of:

Thiolbenzoic anhydride
Thiollauric anhydride and
Thiololeic anhydride were evaluated as follows:

Three grams of each of the stabilizer candidate were blended respectively with 100 grams of polyvinyl chloride resin and 30 grams of dioctyl phthalate plasticizer. Each blend was milled at a temperature of 315° F. Samples of resin were removed from the hot mill at ten minute intervals and examined. The results of this evaluation are shown in Table II, following:

TABLE II

| Stabilizer | Initial | Color at end of timed milling period, minutes | | | | | | | | |
|---|---|---|---|---|---|---|---|---|---|---|
| | | 10 | 20 | 30 | 40 | 50 | 60 | 70 | 80 | 90 |
| Thiobenzoic anhydride | White and clear. | White | White | White | White | White | White | White | Light yellowish. | Yellowish |
| Thiollauric anhydride | do | do | do | do | do | do | do | do | Yellowish | Do. |
| Thiololeic anhydride | do | do | do | do | do | do | Light yellow. | Light yellow. | Yellow | Dark yellow. |

EXAMPLE 10

Preparation of thiolstearic/thiolbenzoic anhydride

One mole of thiolstearic acid is charged to a reaction vessel containing 500 milliliters of benzene as solvent. One mole of benzoyl chloride is added and the reaction is heated to reflux and maintained at reflux for approximately 3 hours. The product is recovered by removal of the solvent.

The mixed thiolstearic/thiolbenzoic acid anhydride provides excellent stability and compatibility with PVC resins.

EXAMPLE 11

Preparation of thiolstearic/thiolacetic anhydride

This compound is prepared in a manner identical to that of Example 10 except that one mole of acetyl chloride is used in place of the benzoyl chloride.

What is claimed is:
1. Compounds of the type:

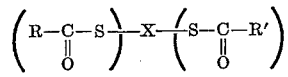

wherein R and R' are hydrocarbyl groups selected from the class consisting of alkyl and aromatic radicals hav-

---

[1] Aerosol AT trademark of American Cyanamid.

ing from 5 to 21 carbon atoms, and X is an alkaline earth metal radical.

2. Compounds of claim 1 in which R and R' are alkyl groups having from 6 to 17 carbon atoms inclusive.

3. Compounds of claim 2 in which X is a calcium radical.

4. Compounds of claim 2 in which X is a barium radical.

5. Compounds of claim 2 in which X is a zinc radical.

6. Compounds of claim 1 in which R and R' are aromatic groups having from 6 to 17 carbon atoms inclusive.

References Cited

FOREIGN PATENTS 1,144,682  10/1967  France _____ 260—399

OTHER REFERENCES

Chemical Abstracts (1959), vol. 53, pars. 22, 759(f).

ELBERT L. ROBERTS, Primary Examiner

U.S. Cl. X.R.

260—23

UNITED STATES PATENT OFFICE
CERTIFICATE OF CORRECTION

Patent No. 3,574,692    Dated April 13, 1971

Inventor(s) Walter Stamm

It is certified that error appears in the above-identified patent and that said Letters Patent are hereby corrected as shown below:

Column 1, line 24, "acryl" should read -- acyl --. Colur 2, line 49, "wherein R' " should read -- wherein R --; line "including ammonia" should read -- including ammonium --. Column 6, line 9, "hot reacting" should read -- hot reaction Columns 5 and 6, Table 1, column 90 should appear as shown be:
                      Black
                      Brown
                      Blank
                      Light Brown
                      Light Brown
                      Blank (omit second "Do")
                      etc.

Signed and sealed this 21st day of September 1971.

(SEAL)
Attest:

EDWARD M. FLETCHER, JR.
Attesting Officer

ROBERT GOTTSCHLAK
Acting Commissioner of Pa